US008844846B2

(12) United States Patent
Owenby et al.

(10) Patent No.: US 8,844,846 B2
(45) Date of Patent: Sep. 30, 2014

(54) BINARY HYDRAULIC MANIFOLD SYSTEM

(75) Inventors: Steve Owenby, Blairsville, GA (US);
Michael Chipman, Cornelia, GA (US);
Ted Battle, Forsyth, GA (US)

(73) Assignee: Katyas Corporation, Cornelia, GA (US)

( * ) Notice: Subject to any disclaimer, the term of this patent is extended or adjusted under 35 U.S.C. 154(b) by 767 days.

(21) Appl. No.: 13/160,826

(22) Filed: Jun. 15, 2011

(65) Prior Publication Data

US 2011/0303312 A1  Dec. 15, 2011

Related U.S. Application Data

(60) Provisional application No. 61/354,804, filed on Jun. 15, 2010.

(51) Int. Cl.
*A01C 17/00* (2006.01)
*F17D 3/00* (2006.01)

(52) U.S. Cl.
CPC ........................................ *F17D 3/00* (2013.01)
USPC .......................................... 239/681; 229/672

(58) Field of Classification Search
CPC ....................................................... A01G 25/00
USPC ..................... 239/681, 566, 548, 650, 672, 69
See application file for complete search history.

(56) References Cited

U.S. PATENT DOCUMENTS

| 4,523,280 A | * | 6/1985 | Bachman | 701/50 |
| 5,052,627 A | * | 10/1991 | Balmer | 239/655 |
| 5,437,499 A | * | 8/1995 | Musso | 298/26 |
| 6,089,743 A | * | 7/2000 | McQuinn | 700/240 |

* cited by examiner

*Primary Examiner* — Davis Hwu
(74) *Attorney, Agent, or Firm* — Thomas|Horstemeyer, LLP

(57) ABSTRACT

A hydraulic fluid manifold system for a spreader, the spreader including at least one bin for holding dry bulk material for distribution to at least one conveyor associated with the bin for receiving the dry bulk material from the at least one bin and transporting the dry bulk material to at least one spinner associated with the spreader. The hydraulic fluid manifold system includes a single, unitary manifold including a variable speed fluid control circuit for setting a speed for the at least one conveyor and a variable speed fluid control circuit for the at least one spinner of a spreader system for setting a speed for the at least one spinner, the variable speed control circuit for the at least one conveyor including an on/off device for the at least one conveyor that allows when fluid flow through the variable speed conveyor circuit to the at least one conveyor is turned on that the at least one conveyor can automatically operate at a speed set for the at least one conveyor prior to fluid flow to the at least one conveyor having been turned off. Further, the spreader can include at least two conveyors, and the variable speed control circuit for the at least two conveyors can further include flow of hydraulic fluid through the variable speed conveyor circuit to be changed between in-parallel flow to a first and a second of the conveyors simultaneously and in-series flow where flow of fluid is sent to a first one of the conveyors and then sent from the first one of the conveyors to a second one of the two conveyors.

15 Claims, 8 Drawing Sheets

US 8,844,846 B2

BINARY HYDRAULIC MANIFOLD SYSTEM

CROSS-REFERENCE TO RELATED APPLICATION

This application claims priority to and the benefit of U.S. provisional application entitled, "Binary Hydraulic Manifold System," having Ser. No. 61/354,804, filed Jun. 15, 2010, which is entirely incorporated herein by reference.

FIELD OF THE DISCLOSURE

The present disclosure relates to a spreader system of the type used to distribute one or more material ingredients, such as dry bulk material, for example fertilizer and fertilizer supplements, compost, poultry litter, gravel, sand and other granular materials, and broadcast them over a ground surface such as an agricultural field, road or other surfaces.

BACKGROUND OF THE DISCLOSURE

It is generally known to provide a spreader system for spreading or broadcasting ingredients, such as fertilizer and fertilizer supplements, organics, sand and other granular materials over a ground surface. A conventional spreader has one or more bins or hoppers for holding dry bulk material for distribution. one or more conveyors are typically provided underneath the bins or hoppers for receiving the dry bulk material from the one or more bins or hoppers and transporting the dry bulk material to one or more spinners located off the tail end of the spreader.

A typical spreader may have individual hydraulic control systems for operating the one or more conveyors and the one or more spinners. These systems have a number of disadvantages. They present a complicated maze of hydraulic lines and associated valves and other equipment for operating the hydraulic systems. Maintenance of such systems is difficult and time consuming. Should, for example, a valve or other associated equipment fail, typically hoses need to be removed consuming significant time and wasted hydraulic oil. Diagnosis of performance issues can also be quite time consuming.

SUMMARY OF THE DISCLOSURE

The binary hydraulic manifold system of the present disclosure is designed to meet and overcome the aforementioned disadvantages of a typical or conventional spreader system. More particularly, the present binary hydraulic manifold system meets these needs. For example, all of the valves can be easily changed without loosening or removing any hydraulic hoses, thus preventing oil loss, reducing labor costs, and providing quick diagnosis of any performance issues. For example, if a valve fails during operation, it can be replaced easily and quickly by removing it from the binary manifold of the present system and replaced with a new valve. No hoses need to be loosened or removed to do so. Furthermore, if the user wishes to convert the spreader system of the present disclosure from manual control spreading to electronically controlled spreading, a manual cartridge that operates the particular circuit that is desired to be converted is easily removed and replaced by an electronically controlled valve. This conversion in the present system typically reduces installation time from four hours to less than one hour.

The binary hydraulic manifold system of the present disclosure accomplishes a plurality of functions within a single, unitary manifold. It allows for either manual control or electronic variable control of spreader conveyor speed and thus the rate of material to be applied and broadcast by the spreader. It also allows for either manual or electronic variable control of the speed of the spinners, thus controlling spread width of material broadcast by the spinners. Pressure relief for both the conveyer hydraulic circuit and spinner hydraulic circuit can be provided. A circuit which changes the oil flow from an in-series arrangement to parallel and back on command may also be provided which provides high output/low output control which when activated can double conveyor speed for very high output rates of material. This circuit also enables a high rate of output without increasing system pressures or higher rates of oil flow, thus maintaining low operating oil temperatures, greatly extending the life of the system.

Additionally, the system provides for on/off control of the conveyor(s) during normal operating conditions which may be used with or without electronic controls. This on/off function allows the conveyor(s) to be turned from an off condition to an on condition while also returning the speed of the conveyor(s) to the speed set prior to turning the conveyor(s) off. In the case of a conventional spreader, when the conveyor is turned back on from having been turned off, typically the speed of the conveyor has to be reset. The present system allows a conveyor to he turned on and operated on the same speed at which it was operating prior to being turned off without further or additional adjustment. This function increases the efficiency and efficacy of the applicator by allowing the spinners to continue running while the conveyor stops momentarily for the spreader to turn around at the end of the row and prepare for the next pass.

In an exemplary embodiment, the present disclosure provides a fluid manifold system for a spreader, the spreader being of the type including at least one bin for holding dry bulk material for distribution to at least one conveyor associated with the bin for receiving the dry bulk material from the at least one bin and transporting the dry bulk material to at least one spinner associated with the spreader. The fluid manifold system comprises a single, unitary manifold including a variable speed fluid control circuit for setting a speed for the at least one conveyor and a variable speed fluid control circuit for the at least one spinner of a spreader system for setting a speed for the at least one spinner, the variable speed control circuit for the at least one conveyor including an on/off device for the at least one conveyor that allows when fluid flow through the variable speed conveyor circuit to the at least one conveyor is turned on that the at least one conveyor can automatically operate at a speed set for the at least one conveyor prior to fluid flow to the at least one conveyor having been turned off.

In another embodiment, the spreader can include at least two conveyors, and the variable speed control circuit for the at least two conveyors in the fluid manifold system further provides that flow of fluid through the variable speed conveyor circuit can be changed between in-parallel flow to a first and a second of the conveyors simultaneously and in-series flow where flow of fluid is sent to a first one of the conveyors and then sent from the first one of the conveyors to a second one of the conveyors. Changing the flow of fluid to in-parallel flow simultaneously to the at least two conveyors can allow the at least two conveyors to run at low speed with high torque relative to providing flow of fluid to the at least two conveyors in-series.

In another exemplary embodiment, the present disclosure provides an hydraulic manifold system for a spreader, the spreader including at least one bin for holding dry bulk material for distribution to at least one conveyor associated with the bin for receiving the dry bulk material from the at least one bin and transporting the dry bulk material to at least one spinner associated with the spreader, the hydraulic manifold system comprising a unitary block including a control circuit for the at least one conveyor and a control circuit for the at least one spinner, the control circuit for the at least one conveyor including a first inlet port to which a first inlet hydraulic fluid line can be connected for delivering hydraulic fluid to the conveyor control circuit and a first outlet port to which a first outlet hydraulic fluid line can be connected for delivering hydraulic fluid from the conveyor control circuit in the unitary block to an hydraulic motor for the at least one conveyor, the conveyor control circuit further including a. conveyor control passageway in the unitary block connecting the first inlet port and the first outlet port together and allowing hydraulic fluid to pass from the first inlet port out through the first outlet port, the unitary block including a first bore, the first bore communicating with the conveyor control passageway, and a first control valve removably connected in the first bore conveyor and inserted into the conveyor control passageway to regulate the flow of hydraulic fluid through the conveyor control passageway to the hydraulic motor for the conveyor and a second bore, the second bore communicating with the conveyor control passageway, and an on/off valve removably connected in the second bore and inserted into the conveyor control passageway to turn flow of hydraulic fluid through the conveyor control passageway on or off, and the control circuit for the at least one spinner including a second inlet port to which a second inlet hydraulic fluid line can be connected for delivering hydraulic fluid to the spinner control circuit and a second outlet port to which a second outlet hydraulic fluid line can be connected for delivering hydraulic fluid from the spinner control circuit in the unitary block to a hydraulic motor for the at least one spinner, the spinner control circuit further including a spinner control passageway in the unitary block connecting the second inlet port and the second outlet port together and allowing hydraulic fluid to pass from the second inlet port out through the second outlet port, the unitary block including a third bore into, the third bore communicating with the spinner control passageway, and a second control value removably connected in the third bore and inserted into the spinner control passageway to regulate the flow of hydraulic fluid through the spinner control passageway and to the hydraulic motor for the at least one spinner.

Other systems, devices, features, and advantages of the disclosed system will be or become apparent to one with skill in the art upon examination of the following drawings and detailed description. It is intended that all such additional systems, devices, features, and advantages be included within this description, be within the scope of the present invention, and be provided by the accompanying claims.

BRIEF DESCRIPTION OF THE DRAWINGS

Many aspects of the binary hydraulic manifold system of the present disclosure can be better understood with reference to the attached drawings, FIGS. 1-4. The components of the drawings are not necessarily to scale, emphasis instead being placed on clearly illustrating the principles of the present system. Moreover, in the drawings, like reference numerals do not need corresponding parts throughout the several views.

DESCRIPTION OF THE EXEMPLARY EMBODIMENTS

Figure 1:
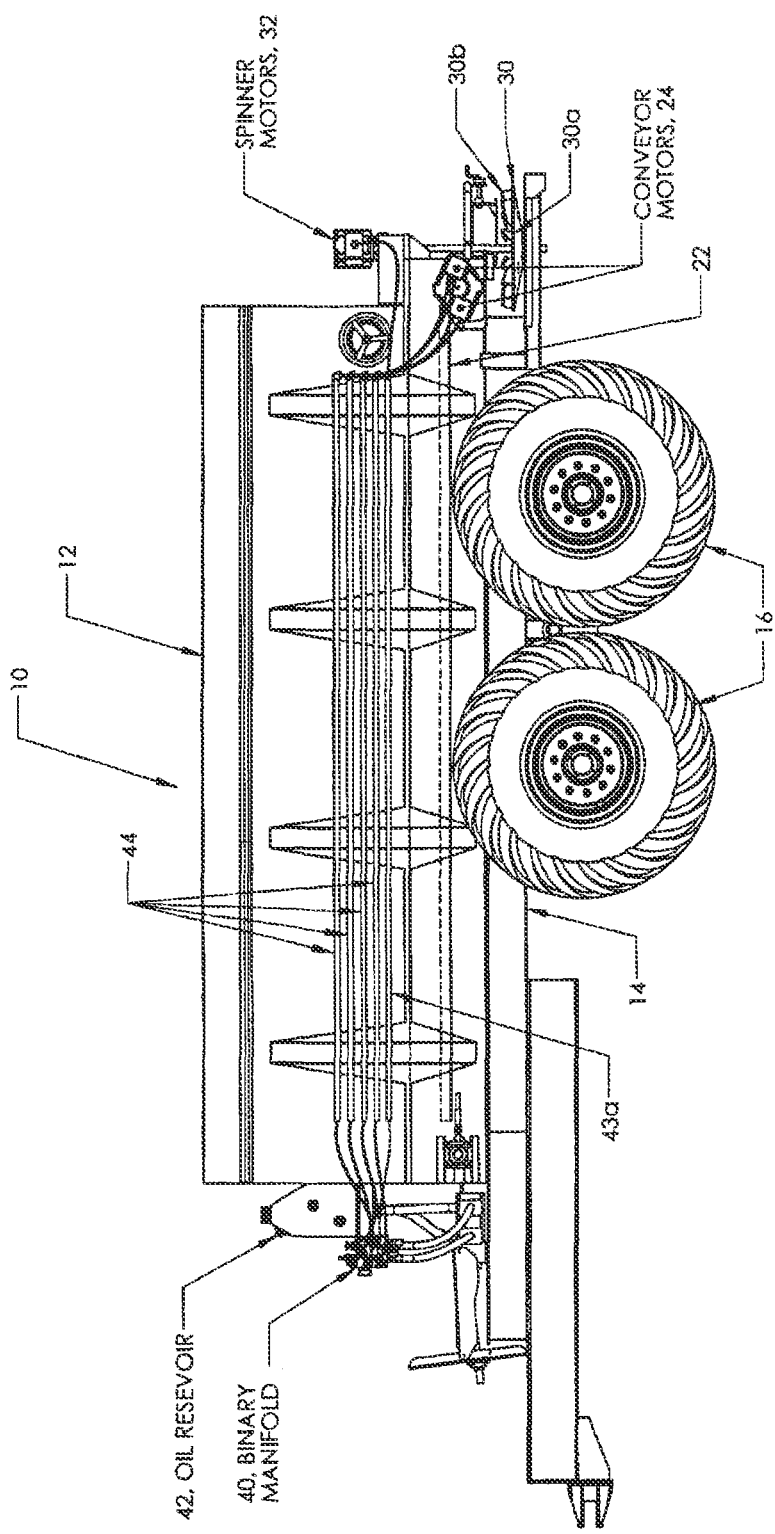
FIG. 1 is a side elevational view of one embodiment of a spreader of the present disclosure.

Referring more specifically to the drawings in which like reference numerals refer to like elements throughout the several views, an exemplary non-limiting embodiment of the binary hydraulic manifold system of the present disclosure is illustrated in FIGS. 1-4. Referring to FIG. 1, one embodiment of a spreader 10 of the present disclosure is illustrated. The spreader 10 includes one or more bins or hoppers 12 mounted on a mobile frame 14 carried by wheels 16. In one embodiment the wheeled frame is designed to be pulled by a tractor (not shown). Each bin or hopper has generally converging walls leading to a discharge port (not shown), allowing for gravitational feed and discharge of material ingredients contained within each respective bin or hopper to the conveyor(s). The bins or hoppers are generally designed for holding and discharging dry, bulk granular materials such as but not limited to fertilizer, fertilizer supplements, herbicides, insecticides, fungicides, soil pH adjusting materials, micronutrients, composted materials, manures, shavings, sand, gravel and the like.

One or more take away conveyors 22, such as a bed chain conveyor or a chain mesh conveyor, are disposed longitudinally underneath the one or more bins or hoppers 12 for receiving bulk material disposed within the bin(s) or hopper(s) for distribution and broadcasting by the spreader. The one or more conveyors are each operated by a conveyor motor 24, such as a variable speed motor.

Positioned off of the end of the one or more conveyors 22 and off of the back end of the bin(s) or hopper(s) 12 are one or more spinners 30 for receiving from the conveyor(s) material discharged from the bin(s) or hopper(s). Typically, though not necessarily, one spinner 30 is associated with each conveyor 22 for receiving material carried by the conveyor from the bin(s) or hopper(s) 12 to the spinner(s) 30. Each spinner 30 is operated by a spinner drive motor 32 connected to a spinner shaft 34 which shaft is connected to the spinner for rotating the associated spinner 30. The spinner drive motors 32 may be variable speed motors allowing for adjustment of the rate of operation of the spinner(s) 30 for distribution or broadcast of the material ingredients from the system.

In an exemplary embodiment, spinner(s) 30 are in the form of disks 30a positioned below and off the end of a take away conveyor 22. The disks 30a may be flat or, concave, for example. Each disk is mounted on a generally vertically disposed shaft 34 with the disk 30a positioned generally parallel to the surface on which the material ingredients are to be distributed. Disks 30a are designed for rotation about shafts 34. Spinner motors 32 are operably connected to shafts 34 for controlling the rate of rotation of spinners 30 and thereby the rate of distribution of material ingredients from spinners 30 over a ground surface below. Disks 30a may have upwardly projecting fins 30b to assist in distributing material ingredients from spinners 30.

As illustrated, spreader 10 includes two conveyors 22, two spinners 30, one spinner associated with one conveyor, and associated drive motors. The spreader of the present disclosure need not have such a configuration. It may have only one conveyor and an associated spinner and associated drive motors, or instead may have more conveyors and spinners. Also, one conveyor may be associated with two or more spinners or vice versa.

In general operation, ingredients from the bin(s) or hopper(s) 12 are discharged to take away conveyor(s) 22. The conveyor(s) 22 serve to deliver the material ingredients to the one or more spinners 30 that serve to distribute or broadcast the material ingredients over a ground surface, such as an agricultural field, food plots within wooded areas, turf and golf course applications and vineyards. An example of a multi-bin spreader generally having a structure such as that described above is shown in U.S. Pat. No. 7,380,733 which patent is incorporated herein as if fully set forth. Such patent, however, does not disclose the binary hydraulic manifold system disclosed herein.

An hydraulic fluid system is provided for controlling the operation of the conveyor(s) 22 and spinner(s) 30 and their associated motors. The present hydraulic fluid system includes a binary hydraulic fluid manifold 40 which is connected to a reservoir 42 for hydraulic fluid or oil for the system. Hydraulic fluid lines 43, 44 connect the binary hydraulic fluid manifold 40 to the conveyor motor(s) 24 and spinner motor(s) 32.

Figure 2:
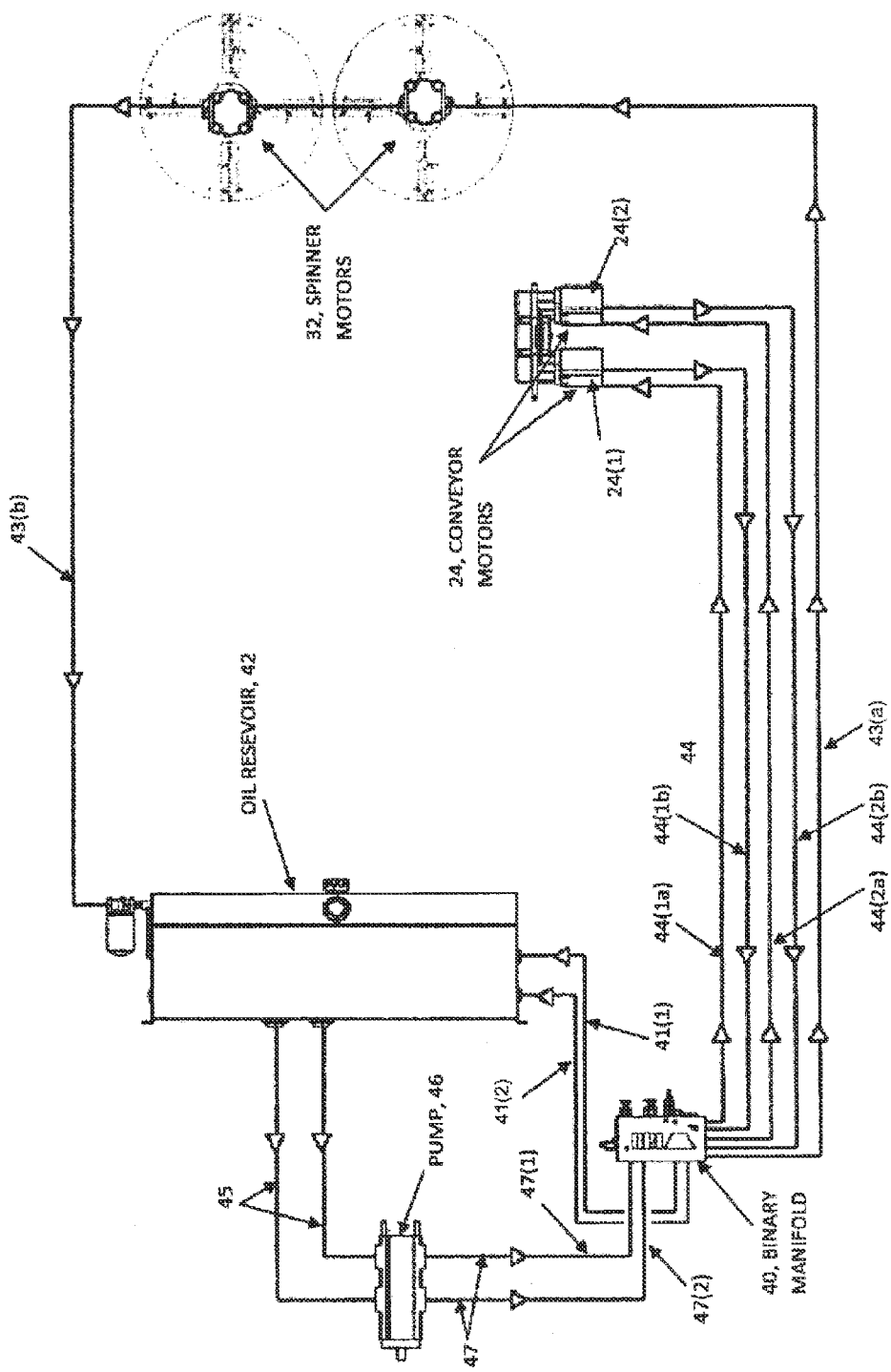
FIG. 2 is a schematic of the main components of the binary hydraulic manifold system of the present disclosure, including the hydraulic lines.

FIG. 2 illustrates one embodiment of an exemplary hydraulic schematic for the system of the present disclosure. Fluid or oil reservoir 42 is connected to the binary hydraulic fluid manifold 40 by means of hydraulic fluid lines 45 leading from the oil reservoir 42 to pump 46. Hydraulic fluid lines 47 then connect the pump 46 to the binary hydraulic fluid manifold 40. Fluid or oil return lines 41(1) and 41(2), generally referred to as oil return lines 41, are provided from the binary hydraulic fluid manifold 40 back to the oil reservoir 42. Hydraulic fluid lines 44 are provided for connecting the binary hydraulic fluid manifold 40 to the conveyor motor(s) 24.

FIG. 2 illustrates two exemplary conveyor motors 24(1) and 24(2), generally referred to as conveyor motors 24, and hydraulic fluid lines 44(1a) and 44(2a) for delivering hydraulic fluid or oil from the binary hydraulic fluid valve 40 to each conveyor motor 24 and then return lines 44(1b), 44(2b) for returning fluid or oil back from the conveyor motors 24 to the binary hydraulic fluid manifold 40, these hydraulic fluid lines generally referred to as hydraulic lines 44. An hydraulic fluid line 43(a) is also provided to connect the binary hydraulic fluid valve 40 to the spinner motor(s) 32.

In FIG. 2 two exemplary spinner motors 32 are illustrated and shown to be connected in series such that hydraulic fluid line 43(a) delivers oil from binary hydraulic fluid manifold 40 to the first spinner motor and then from the first spinner motor to the second spinner motor. An hydraulic fluid return line 43(b) then connects the second spinner motor 32 to reservoir 42 for returning fluid or oil from the spinner motors 32 back to the reservoir 42.

Figure 3:
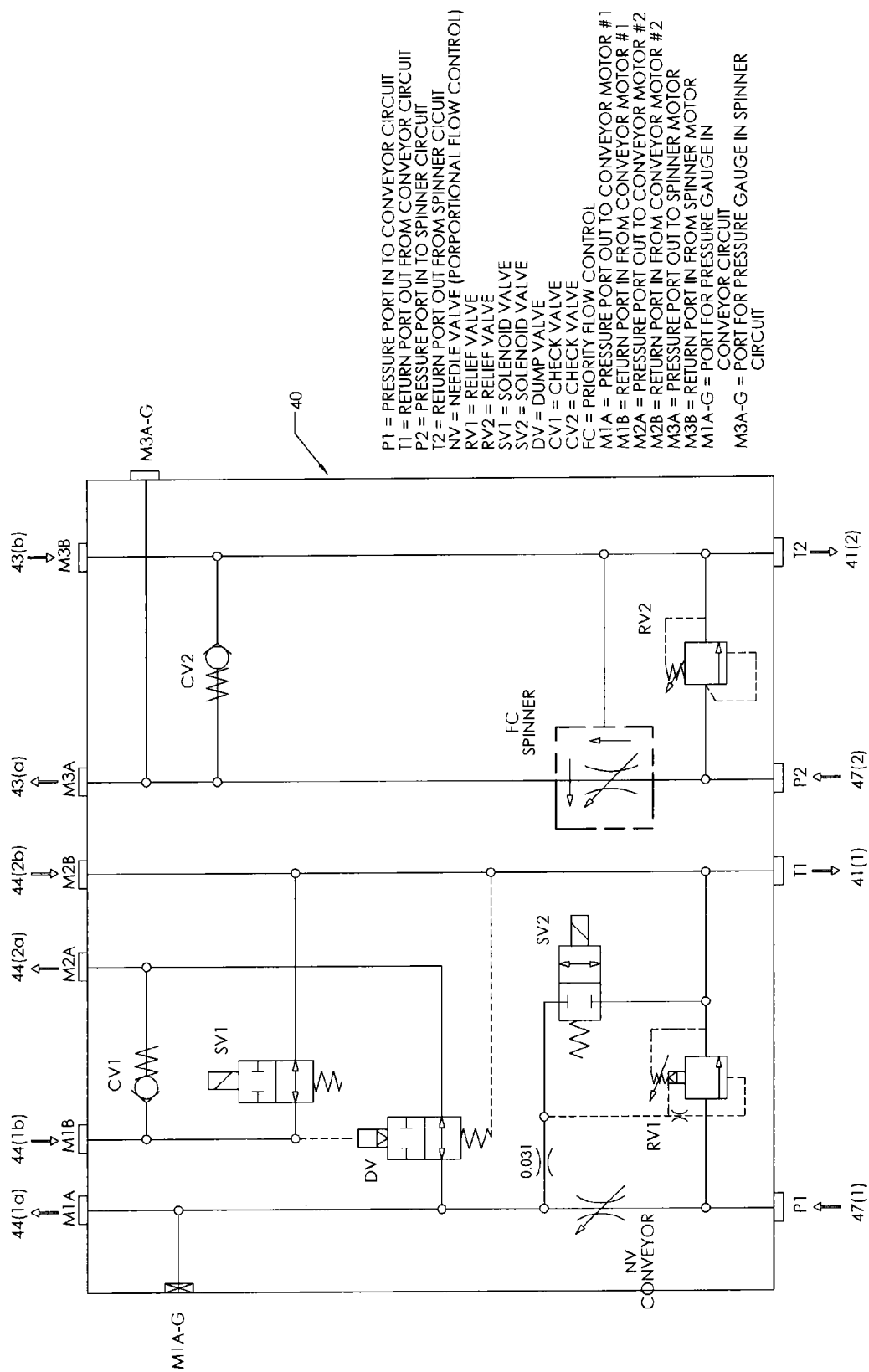
FIG. 3 is an exemplary schematic view of the binary hydraulic manifold which is a component of the system illustrated in FIG. 2.

FIG. 3 illustrates one embodiment of a representative schematic for the binary hydraulic fluid manifold 40. The binary hydraulic fluid manifold 40 is a unitary block (see, e.g. FIGS. 4(a)-(e)) having various bores and passageways through the block, providing within the block the hydraulic fluid circuitry illustrated in FIG. 3.

Conveyor Control

For the hydraulic fluid circuit that controls the conveyor, fluid enters the binary hydraulic fluid manifold from line 47(1) at P1 then out port M1A to line 44(1a) and port M2A to line 44(2a) to turn the conveyor drive motors 24(1), 24(2). The fluid then returns back to the binary hydraulic fluid manifold 40 through port M1B from line 44(1b) and port M2B from line 44(2b), and finally back out port T1 to line 41(1) to the reservoir 42.

NV is a needle valve that regulates the fluid flow rate which affects the speed of the conveyor(s) 22. Needle valve NV is manually operated. RV1 is a relief valve that sets the pressure of the conveyor circuit. SV2 is a solenoid valve that allows the conveyor(s) to be turned off. When solenoid valve SV2 is activated to turn the conveyor(s) back on, the speed of the conveyor(s) remains set by needle valve NV at the conveyor speed setting at the time of turning off the conveyor(s). Thus, when solenoid valve SV2 is activated to turn the conveyor(s) back on the speed of the conveyor(s) does not need to be reset to their speed or cut off.

M1A-G is a port for connecting a pressure gauge in the conveyor circuit for monitoring and maintaining proper fluid or oil pressure in the conveyor circuit.

In another embodiment, valve NV can be replaced with a servo valve or a PWM (pulse width modulation) valve that will electronically control the speed of the conveyor(s). No additional plumbing is needed to add this functionality.

As illustrated in FIG. 3, solenoid valve SV1, dump valve DV and check valve CV1 are tied together in another circuit. The combination of SV1, DV, and CV1 changes the flow of the hydraulic fluid so that the conveyor motors 24 are either running in parallel or in series. In an exemplary embodiment changing the oil flow from in-series to in-parallel allows the conveyor motors 24 to run in low speed with high torque. Operating in series doubles the speed of the motors and reduces the torque by half Spinner Control For the hydraulic circuit that controls the spinner(s) 30, fluid enters the binary hydraulic fluid manifold 40 from the line 47(2) from the pump 46 at port P2 then out at port M3A to line 43(a) to turn the spinner motor(s) 32. The fluid returns from line 43(b) to the binary hydraulic fluid manifold 40 through port M3B and then out port T2 to line 41(2) to the reservoir 42.

FC is a priority fluid flow control valve that manually controls the speed of the spinner(s) 30. RV2 is a relief valve that sets the pressure of the spinner circuit.

CV2 is a check valve that allows the spinner(s) 30 to coast to a stop after fluid flow has stopped.

The circuit illustrated in FIG. 3 does not provide for electronic control of the spinner circuit. The port used for manual control could be used, however, for electronic spinner control. To do so would require a solenoid valve installed in the port currently used for the manual control of the spinner(s).

M3A-G is a port for connecting a pressure gauge in the spinner circuit for monitoring and maintaining proper fluid or oil pressure in the spinner circuit.

FIGS. 4(a)-4(e) illustrate an exemplary embodiment of the binary control manifold (40) of the present system in the form of a unitary block. Views of various sides of the unitary block are shown illustrating, for example, where ports are provided for insertion of the various aforementioned valves and devices or connection of the various aforementioned hydraulic lines to the unitary block, to carry out the circuit illustrated in FIG. 3. The references labeled in FIGS. 4(a)-(e) correspond to the same references in FIGS. 1-3.

Figure 4A:
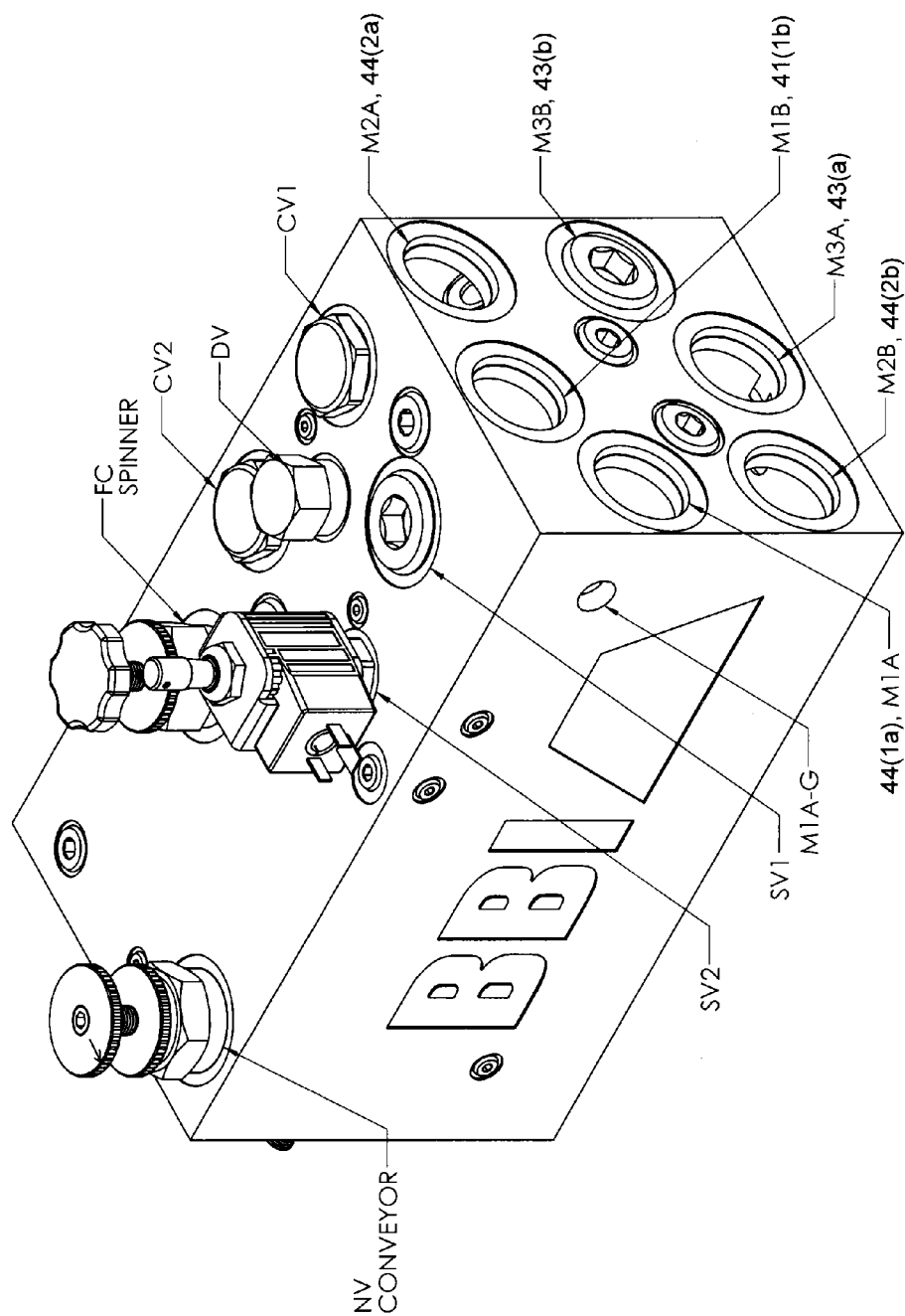
FIGS. 4(a)-(e) are various views of an exemplary binary hydraulic manifold of the present disclosure incorporating the schematic of FIG. 3.
Figure 4B:
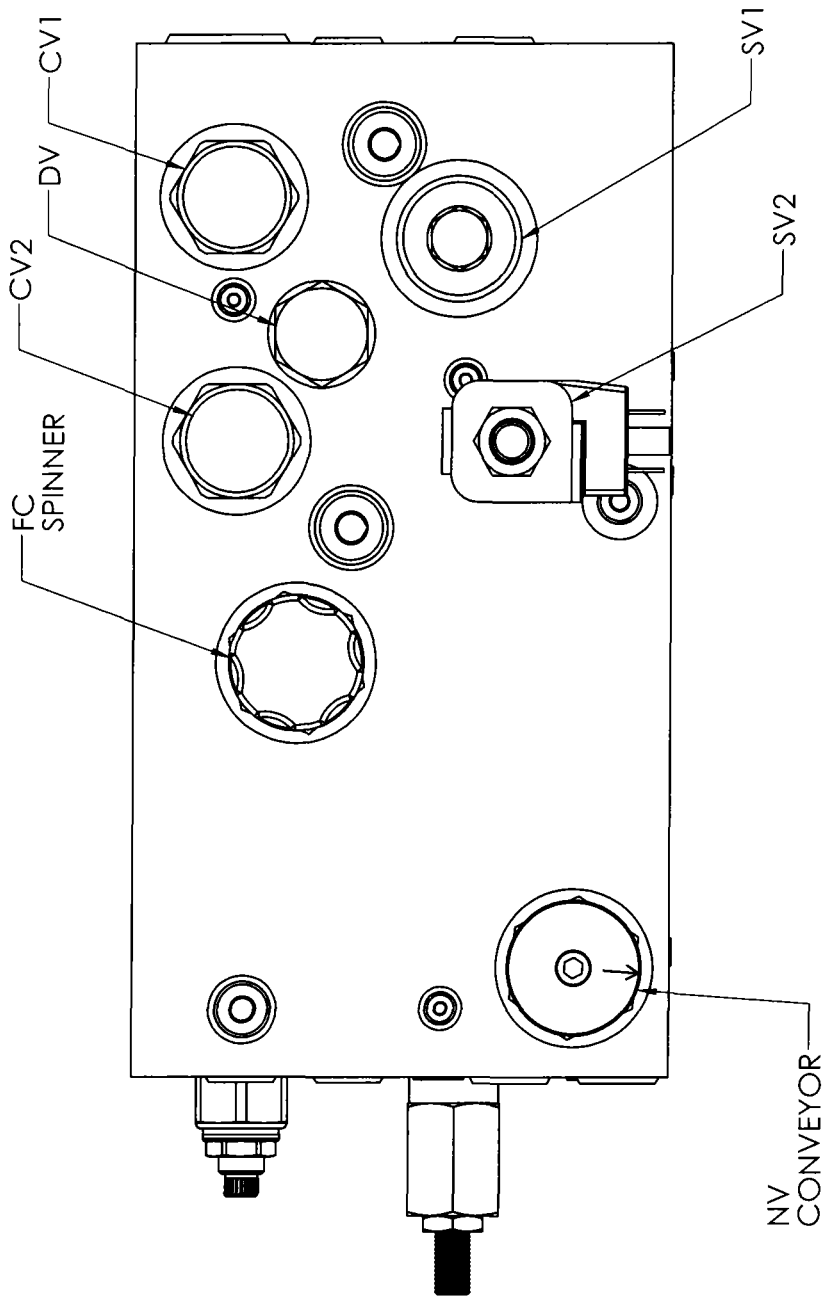
Figure 4C:
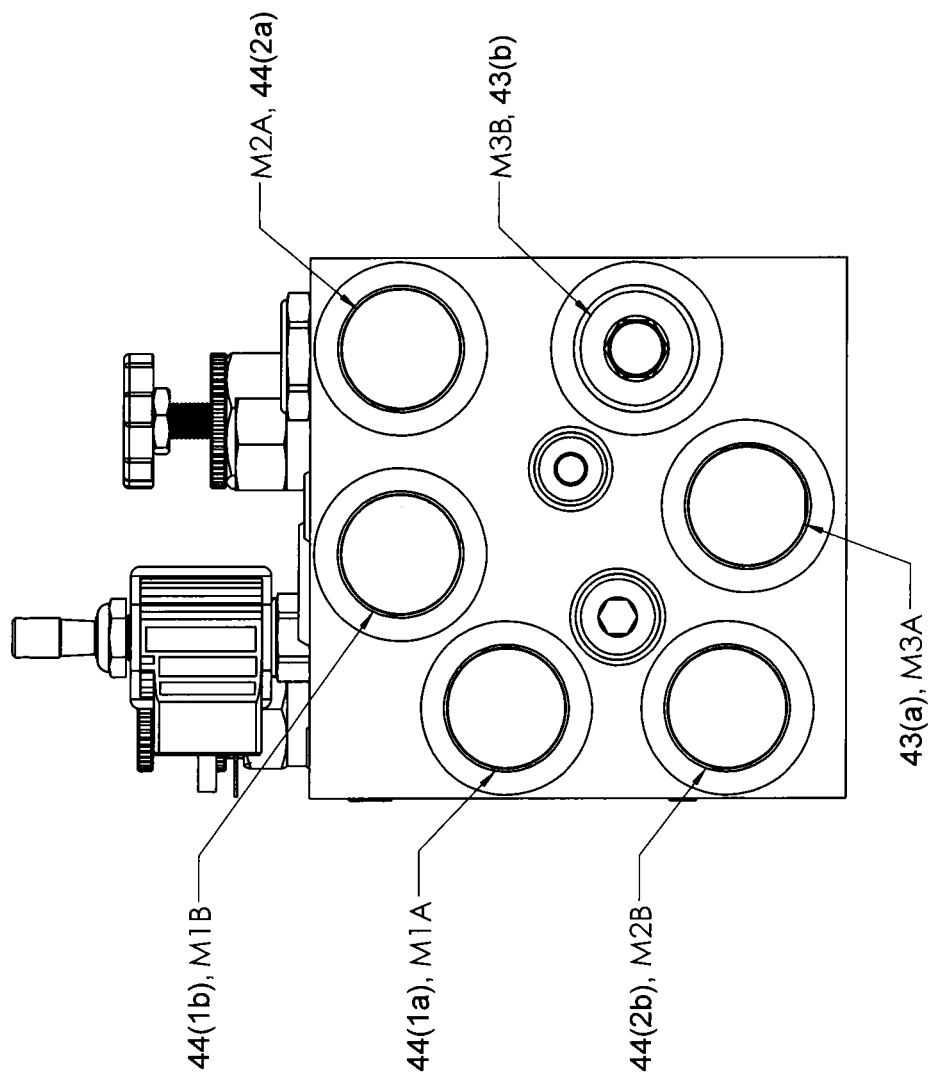

FIG. 4(a) is a perspective view of an exemplary unitary block of binary hydraulic fluid manifold 40. FIG. 4(b) is a top planar view of the block of FIG. 4(a). FIG. 4(c) is an end view of the block of binary hydraulic fluid manifold 40 from the right side of FIG. 4(a). In FIG. 4(c), ports 44(1a) and 44(2a) allow for connection of the corresponding hydraulic fluid lines 44(1a) and 44(1b) of FIGS. 2 and 3 to the binary hydraulic fluid manifold 40 for providing hydraulic fluid from the binary hydraulic fluid manifold 40 to conveyor motors 24(1) and 24(2). Similarly, ports 44(1b) and 44(2b) are ports for connection of the corresponding hydraulic fluid lines 44(1b) and 44(2b) of FIGS. 2 and 3 to the binary hydraulic fluid manifold 40 for providing a return of the hydraulic fluid from the conveyor motors 24(1) and 24(2) to the binary hydraulic fluid manifold 40. Likewise, port 43(a) provides a connection for the hydraulic fluid line 43(a) of FIGS. 2 and 3 to the binary hydraulic fluid manifold 40 for providing hydraulic fluid from binary hydraulic manifold 40 to the spinner motors 32 while port 43(b) provides a connection for the hydraulic fluid line 43(b) for return of the hydraulic fluid from spinner motors 32 to oil reservoir 42 as illustrated in FIG. 2. Bores are provided within binary hydraulic fluid manifold 40 to provide the circuitry illustrated in FIG. 3 within binary hydraulic fluid manifold 40 to complete the schematic of FIG. 3 in conjunction with the placement of various valves and devices identified in FIGS. 4(a)-4(e) corresponding to the valves and devices illustrated in the schematic of FIG. 3.

Figure 4D:
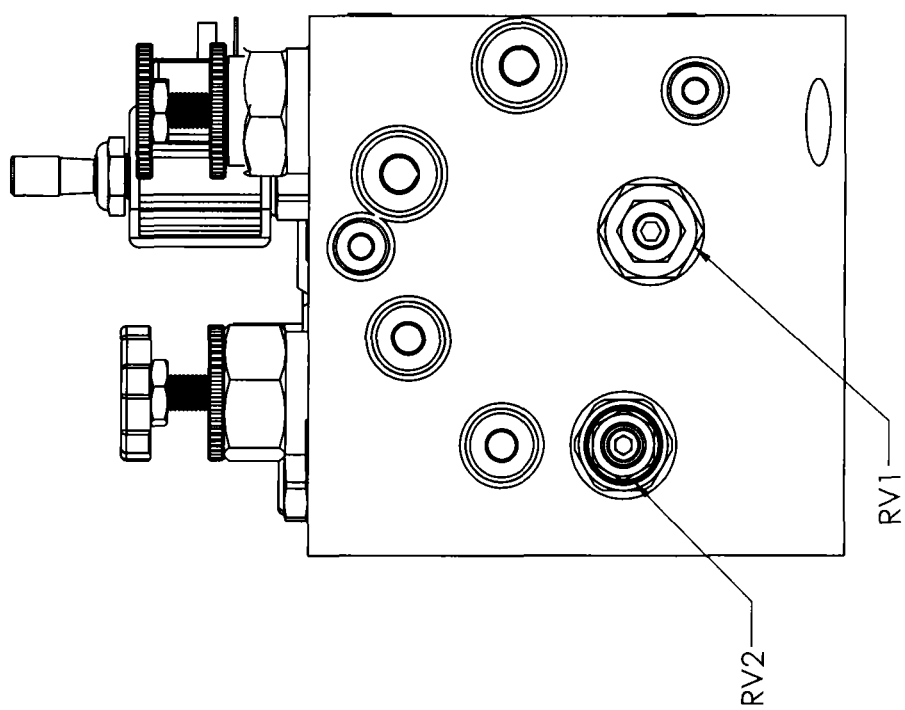
Figure 4E:
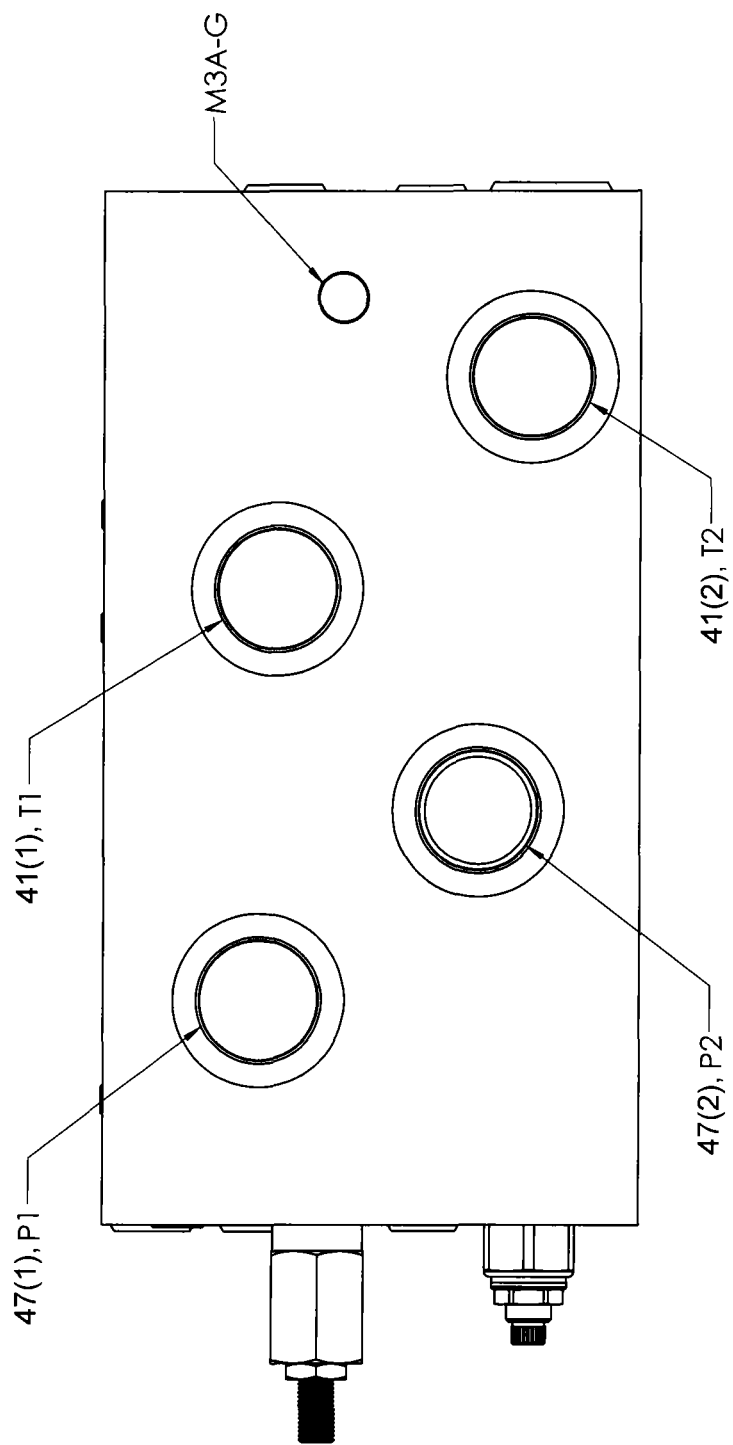

FIG. 4(d) illustrates a side elevational view of the left side of the binary hydraulic fluid manifold 40 of FIG. 4(a) opposite that illustrated in FIG. 4(c), FIG. 4(e) illustrates a bottom view of a binary hydraulic fluid manifold 40 of FIG. 4(a). Ports 47(1) and 47(2) provide connection for hydraulic fluid lines 47(1) and 47(2) of FIG. 2 which connect pump 46 to binary hydraulic fluid manifold 40 for providing hydraulic fluid from pump 40 to binary hydraulic fluid manifold 40. Ports 41(1) and 41(2) are ports providing a connection for corresponding hydraulic fluid lines 41(1) and 41(2) of FIG. 2 connecting binary hydraulic fluid manifold 40 to reservoir 42 and providing for a return of hydraulic fluid from binary hydraulic manifold 40 back to reservoir 42.

As can be seen from the foregoing description, the binary hydraulic fluid manifold system of the present disclosure includes a single, unitary manifold that provides variable speed control for one or more conveyors and variable speed control for one or more spinners of a spreader system. Additionally, the manifold provides on/off control for the one or more conveyors that additionally allows when a conveyor is turned back on that it can automatically operate at the speed setting for the conveyor prior to the conveyor having been turned off.

The single, unitary binary hydraulic fluid manifold simplifies installation and maintenance of the hydraulic system for the spreader. As can be seen from FIGS. 4(a)-(e) valving and other devices, as described above, are incorporated into the manifold in a manner that allows the valves and other devices to readily and easily be replaced without having to connect or disconnect any hydraulic fluid lines. The manifold also simplifies and reduces the number of hydraulic fluid lines required.

The afore-described binary hydraulic fluid manifold is but an exemplary embodiment of the present disclosure. One skilled in the art will recognize that other embodiments may include control for any number of combinations of conveyors and spinners. For example, control can be provided for a combination of only one conveyor and one spinner, one conveyor and two spinners, two conveyors and one spinner, etc. Moreover, more than two conveyors and associated conveyor motors and/or more than two spinners and associated spinner motors can be provided.

It should be emphasized that the above-described embodiments of the present system, particularly any "preferred" embodiments are merely possible examples of implementations, merely set forth for a clear understanding of the principles of the invention. One skilled in the art will readily recognize that many variations and modifications may be made to the above-described embodiment(s) without departing substantially from the spirit and principles of the invention. All such modifications and variations are intended to be included herein within the scope of this disclosure and protected by the following claims.

The invention claimed is:

1. An hydraulic fluid manifold system for a spreader, the spreader including at least one bin for holding dry bulk material for distribution to at least one conveyor associated with the bin for receiving the dry bulk material from the at least one bin and transporting the dry bulk material to at least one spinner associated with the spreader, the hydraulic fluid manifold system comprising a unitary block including a control circuit for the at least one conveyor and a control circuit for the at least one spinner, the control circuit for the at least one conveyor including a first inlet port to which a first inlet hydraulic fluid line can be connected for delivering hydraulic fluid to the conveyor control circuit and a first outlet port to which a first outlet hydraulic fluid line can be connected for delivering hydraulic fluid from the conveyor control circuit in the unitary block to an hydraulic motor for the at least one conveyor, the conveyor control circuit further including a conveyor control passageway in the unitary block connecting the first inlet port and the first outlet port together and allowing hydraulic fluid to pass from the first inlet port out through the first outlet port, the unitary block including a first bore, the first bore communicating with the conveyor control passageway, and a first control valve removably connected in the first bore conveyor and inserted into the conveyor control passageway to regulate the flow of hydraulic fluid through the conveyor control passageway to the hydraulic motor for the conveyor and a second bore, the second bore communicating with the conveyor control passageway, and an on/off valve removably connected in the second bore and inserted into the conveyor control passageway to turn flow of hydraulic fluid through the conveyor control passageway on or off, and the control circuit for the at least one spinner including a second inlet port to which a second inlet hydraulic fluid line can be connected for delivering hydraulic fluid to the spinner control circuit and a second outlet port to which a second outlet hydraulic fluid line can be connected for delivering hydraulic fluid from the spinner control circuit in the unitary block to a hydraulic motor for the at least one spinner, the spinner control circuit further including a spinner control passageway in the unitary block connecting the second inlet port and the second outlet port together and allowing hydraulic fluid to pass from the second inlet port out through the second outlet port, the unitary block including a third bore into, the third bore communicating with the spinner control passageway, and a second control value removably connected in the third bore and inserted into the spinner control passageway to regulate the flow of hydraulic fluid through the spinner control passageway and to the hydraulic motor for the at least one spinner.

2. The hydraulic fluid manifold system of claim 1, wherein the unitary block further includes another bore communicating with the spinner control passageway into which another valve can be removably connected and inserted into the spinner control passageway that allows the spinner to coast to a stop after fluid flow through the spinner control passageway has stopped.

3. The hydraulic fluid manifold system of claim 2, wherein the another valve is a check valve.

4. The hydraulic fluid manifold system of claim 1, wherein either or both of the first and second control valves provide variable control of the speed of their respective associated at least one conveyor or at least one spinner.

5. The hydraulic fluid manifold system of claim 4, wherein either or both of the first and second control valves provide electronic variable control of the speed of their respective associated at least one conveyor or at least one spinner.

6. The hydraulic fluid manifold system of claim 5, wherein the first control valve is either a servo valve or a pulse width modulation valve.

7. The hydraulic fluid manifold system of claim 1, wherein either or both of the conveyor control circuit and the spinner control circuit include a relief valve to set the pressure of the respective circuit.

8. The hydraulic fluid manifold system of claim 1, wherein the on/off valve in the conveyor control circuit can be activated to an off position to stop the flow of hydraulic fluid to the motor for the at least one conveyor for a period of time while the system allows hydraulic fluid to continue to flow to the motor for the at least one spinner.

9. The hydraulic fluid manifold of claim 1, wherein the unitary block further includes a third outlet port to which a third hydraulic fluid line can be connected for delivering hydraulic fluid from the conveyor control circuit to a second hydraulic motor for a second conveyor, the conveyor control circuit including a parallel branch passageway for delivering hydraulic fluid from the first inlet port to the third outlet port in addition to the passageway for delivering hydraulic fluid from the first inlet port to the first outlet port, and another valve in the conveyor control circuit for turning on or off flow of hydraulic fluid from the first inlet port through the parallel branch passageway.

10. The hydraulic fluid manifold of claim 9, wherein the unitary block further includes valving associated with the parallel branch passageway for delivering hydraulic fluid from the first inlet port to the third outlet port, the further valving cooperating with the another valve for turning on or off flow of hydraulic fluid from the first inlet port through the parallel passageway to allow flow of hydraulic fluid to be changed between in-parallel flow to the motors for the first and second conveyors simultaneously and in-series flow where the flow of hydraulic fluid is sent to a first one of the motors for one of the conveyors and then sent from the first one of the motors of the conveyors to a second one of the motors for the other of the two conveyors.

11. The hydraulic fluid manifold of claim 10, wherein changing the flow of hydraulic fluid to in-parallel flow simultaneously to the motors for the two conveyors allows the two conveyor motors to run at low speed with high torque relative to providing flow of hydraulic fluid to the two conveyor motors in-series.

12. The hydraulic fluid manifold of claim 10, wherein the valving includes a solenoid valve and a check valve, and the another valve is a dump valve.

13. A fluid manifold system for a spreader, the spreader including at least one bin for holding dry bulk material for distribution to at least one conveyor associated with the bin for receiving the dry bulk material from the at least one bin and transporting the dry bulk material to at least one spinner associated with the spreader, the fluid manifold system comprising
 a single, unitary manifold including a variable speed fluid control circuit for setting a speed for the at least one conveyor and a variable speed fluid control circuit for the at least one spinner of a spreader system for setting a speed for the at least one spinner,
 the variable speed control circuit for the at least one conveyor including an on/off device for the at least one conveyor that allows when fluid flow through the variable speed conveyor circuit to the at least one conveyor is turned on that the at least one conveyor can automatically operate at a speed set for the at least one conveyor prior to fluid flow to the at least one conveyor having been turned off.

14. The fluid manifold system of claim 13, wherein the spreader includes at least two conveyors, and the variable speed control circuit for the at least two conveyors further includes flow of fluid through the variable speed conveyor circuit to be changed between in-parallel flow to a first and a second of the conveyors simultaneously and in-series flow where flow of fluid is sent to a first one of the conveyors and then sent from the first one of the conveyors to a second one of the at least two conveyors.

15. The fluid manifold system of claim 14, wherein changing the flow of fluid to in-parallel flow simultaneously to the at least two conveyors allows the at least two conveyors to run at low speed with high torque relative to providing flow of fluid to the at least two conveyors in-series.

\* \* \* \* \*